March 21, 1939.  E. A. MILHAUPT  2,151,278
VALVE CONTROL MECHANISM
Filed March 27, 1937
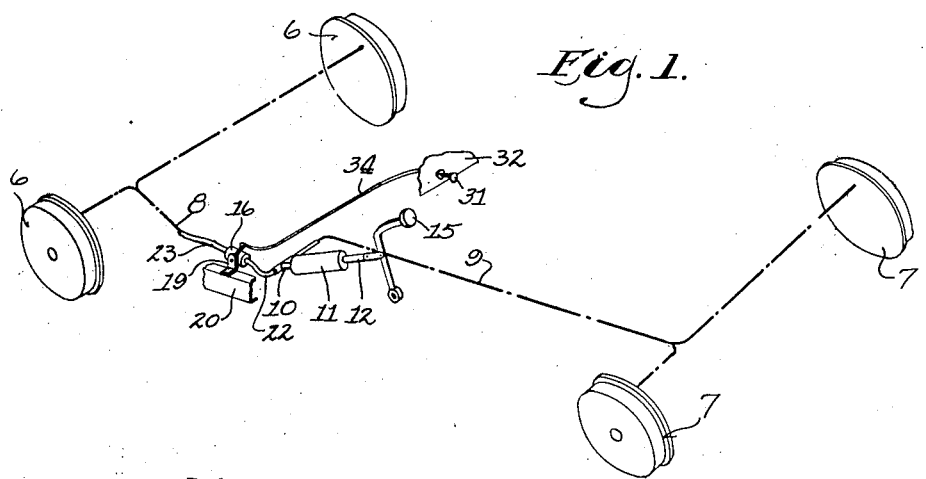

Patented Mar. 21, 1939

2,151,278

UNITED STATES PATENT OFFICE 2,151,278

VALVE CONTROL MECHANISM

Edgar A. Milhaupt, Appleton, Wis.

Application March 27, 1937, Serial No. 133,354

14 Claims. (Cl. 188—152)

This invention relates to improvements in valve control mechanism, with particular reference to an arrangement for cutting off communication between the front wheel brakes of a motor vehicle and the master cylinder of a hydraulic brake system.

It is the primary object of the invention to provide the desired control of a valve without any packing or diaphragm, or any other connections, extending into the hydraulic line and through which leakage or displacement might occur. More particularly stated, it is my purpose in a hydraulic brake system to enable a particular brake or brakes to be cut off from the rest of the system by means of a control located conveniently to the operator and effective on a valve within the system without having any direct mechanical connection with the valve itself.

In the drawing:

Figure 1 diagrammatically illustrates, in perspective, the hydraulic brake system of a motor vehicle.

Figure 2 is an enlarged detail view in axial section through a valve mechanism embodying the invention.

Figure 3 is a view similar to Figure 2 showing the valve in its closed position.

Figure 4 is a plan view of the valve mechanism showing the mounting thereof and the connection of the operating control to the valve casing.

Figure 5 is a view taken in section on the line 5—5 of Figure 4.

Like parts are identified by the same reference characters throughout the several views.

In the diagrammatic illustration of a hydraulic brake system the brakes individual to the front wheels are diagrammatically indicated at 6, and the brakes individual to the rear wheels are diagrammatically indicated at 7. The pressure line 8 divides and leads to the brakes 6 and the pressure line 9 divides and leads to the brakes 7. Both lines communicate at 10 with the master cylinder 11, the piston 12 of which is connected in the usual manner with the pedal 15.

In accordance with the present invention, means is provided for cutting off brakes 6 from communication with the master cylinder when desired. This is so important, particularly in the case of trucks operated over icy pavements, that in many districts it is the practice to truckers to disconnect and attempt to seal the pressure lines to the front wheel brakes. Even the most careful attempts to plug these lines, however, frequently leave them subject to leakage, and any leakage whatever occurring at any point in the system renders the rest of the system less effective and possibly inoperative to a dangerous degree. Moreover, it is not at all uncommon for trucks to experience icy roads for a short distance and then to find perfectly dry pavements. If the pressure lines to the front wheel brakes have been plugged in order to enable the driver to cope with the icy roads, he is deprived of the effectiveness of the front wheel brakes on the dry pavements, where his speeds are higher and the front wheel brakes could be used with safety and are really needed.

In accordance with the present invention, I provide at 16 a valve casing in which the valve may be operated without any extraneous mechanical connection through the casing to the valve mechanism itself. The casing is provided at 17 with a boss into which I screw a fulcrum pin 18, journaled in a suitable opening in a bracket 19 which may be secured to the frame 20 of the vehicle. I preferably incorporate a helical compression spring 21 beneath the head of the screw to engage the bracket and draw the boss tightly to the bracket.

The inlet tube 22 through which pressure is communicated from the master cylinder 11 to the casing 16 is flexible, and so likewise is the outlet tube 23 which leads from the valve casing 16 to the remainder of the pressure line 8. By reason of these flexible hydraulic connections it is possible for the casing 16 to be oscillated bodily upon the axis of pin 18.

Within the casing I provide a ball check 25 which is reciprocable axially of the casing between guides which may constitute the four pins 26. When the ball is in the inlet end of the casing, as shown in Figure 2, it is obviously incapable of obstructing hydraulic communication through the casing to the brakes 6. The fitting to which the flexible conduit 22 is connected does not provide a seat for the ball.

At the opposite end of the casing, however, I provide a seat 28 upon which the ball 25 is seated in Figure 3. With the ball in this position it is impossible for the master cylinder to transmit pressure to the brakes 6, although any existing pressure in such brakes will easily be relieved as the clutch pedal 15 is retracted.

The ball may be caused to take its position at either end of the valve casing 16 by simply tilting the casing between the position shown in Figure 2 and the position shown in Figure 3. The tilting movement of the casing may conveniently be effected by means of the convenient Bowden wire control, of which the wire 29 represents the controlling element connected to the arm 30 of the casing, and to a convenient handle 31 on the instrument panel 32 within reach of the operator. In accordance with the usual practice, this wire is encased in a sheath 34 having its lower end anchored in an arm 35 of the bracket 19.

Flexible hydraulic conduits, such as those shown at 22 and 23, are already available, being regularly used in transmitting hydraulic brake pressure to the brakes of the front dirigible wheels of motor vehicles. There is no danger of leakage in the use of such flexible connections. Neither is there any leakage possible in the means which actuates the valve to and from its seat, since such means is connected only with the exterior of the valve casing, and there is no movable part which at any point penetrates into the hydraulic system. The real actuating force is, of course, the attraction of the earth for the ball, which draws it to one end of the casing or the other according to the inclination of the casing as controlled by the adjustment of the Bowden wire 29, which is readily operated by means of handle 31 from the driver's seat.

While I have illustrated the invention with particular reference to a means of cutting off the front wheel brakes of a vehicle from the rest of a fluid operated brake system, it may also be applied in other connections. Even in automotive practice there are instances in which it is desirable to disconnect temporarily the brakes of a trailer, or to disconnect the brakes at one side of a vehicle in order to render the brakes at the other side thereof temporarily more effective. In any such organization, or elsewhere in cases such that high pressures or other operating conditions make it difficult to avoid leakage, my improved valve is readily applicable.

There are so many possible applications of the generic concept of a valve operable to and from its seat without entry of any mechanical actuating connection into its casing that it is to be understood that the illustrated embodiment of my invention is purely illustrative from the standpoint of the generic claims annexed.

I claim:

1. In a fluid control system, the combination with a valve casing provided with a seat and a valve within said casing movable by gravity to and from said seat, of a support provided with means pivotally mounting said casing for tilting movement, and means wholly externally of said casing for tilting said casing sufficiently for actuating said valve to and from said seat, said casing having supply and discharge connections provided with portions relatively movable for the accommodation of the tilting movement of the casing.

2. In a closed hydraulic system, the combination with a valve casing sealed against external communication with said system and provided with a valve seat, of a valve in said casing operable to and from said seat, and control means for said valve entirely external with respect to said casing and provided with remote operating connections including a special handle connected solely for the control of said valve, and a support on which said handle is mounted for movement exclusively in valve operation.

3. In an automotive hydraulic brake system, the combination with a pressure conduit provided with a valve casing sealed against external communication with said conduit and having an internal valve seat, of a valve movable to and from said seat within said casing to control flow through said conduit, braking mechanism controlled by flow through said conduit, whereby to be rendered inoperative by the movement of said valve to its seat, means disposed entirely externally of said valve casing and conduit for the control of the movement of the valve, and remote actuating connections for said valve control means including a special handle free at all times for, and requiring, manual manipulation independently of any other alternative function, for the control of said valve.

4. In a device of the character described, the combination with a valve casing providing a seat, of a relatively fixed support for said casing, means pivotally mounting said casing for oscillatory adjustment respecting its support, a valve movable by gravity in said casing to and from said seat, and means for the bodily oscillation of said casing between positions for the gravity induced movement of said valve to and from its seat.

5. In a device of the character described, the combination with a valve casing having supply and discharge conduit connections and provided internally with a valve seat and a valve controlling communication between said connections, said valve being movable to and from said seat, of means for oscillating said casing between a tilted position in which gravity tends to seat said valve and an oppositely tilted position in which gravity tends to unseat said valve, said connections being adapted to permit such oscillation.

6. In a device of the character described, the combination with a valve casing provided with a mounting upon which said casing is oscillatable between two extreme positions oppositely tilted with reference to the horizontal, of a ball valve movable in said casing in accordance with the tilted position of the casing, said casing providing a seat engaged by said ball valve in one of said positions, and conduits connected with said casing and having communication therethrough controlled by said valve, said conduits being adapted to accommodate the tilting movement of said casing.

7. In a device of the character described, the combination with a valve casing providing a seat, of a valve mounted for gravity induced movement in said casing to and from said seat, means for oscillating said casing between positions oppositely inclined with reference to the horizontal for inducing a gravitational movement of said valve to and from its seat, and flexible conduit means connected with said casing for communication therethrough subject to the control of said valve while permitting the oscillation of said casing.

8. In a fluid conduit system, the combination with a conduit, of a valve casing connected therewith and provided with a valve seat, a valve movable to and from said seat in said casing to control flow through said conduit, and purely mechanical means wholly external with reference to said casing for controlling the movement of said valve to and from its seat.

9. In a hydraulic brake system, the combination with a conduit provided with connections to a brake for the operation thereof, of a casing provided with a valve seat and connected with said conduit, a valve movable in said casing to and from said seat, and means for oscillating said casing bodily to oppositely tilted positions for gravity induced movement of said valve to and from its seat, said connections accommodating the oscillatory adjustment of said casing.

10. In an automotive hydraulic brake installation, the combination with a brake and a brake actuating conduit, of a valve casing having an internal chamber connected for communication with said conduit and having a valve seat, a valve movable in said casing chamber to and from said seat for controlling communication between said casing chamber and conduit for rendering said conduit ineffective upon said brake, a pressure connection to said casing, and remotely controlled means disposed wholly externally of said casing chamber and having no movable connection through said valve casing for moving said valve to and from its seat.

11. In an automotive hydraulic brake installation, the combination with a brake and a brake actuating conduit, of a valve casing connected for communication with said conduit and having a valve seat, a valve movable in said casing to and from said seat for controlling communication between said casing and conduit for rendering said conduit ineffective upon said brake, a pressure connection to said casing, and remotely controlled means for moving said valve to and from its seat, said means comprising a part connected with said casing for the bodily oscillation thereof between positions of opposite tilt sufficient to induce by gravity the seating and unseating movements of said valve.

12. In an automotive hydraulic brake installation, the combination with a brake and a brake actuating conduit, of a valve casing connected for communication with said conduit and having a valve seat, a valve movable in said casing to and from said seat for controlling communication between said casing and conduit for rendering said conduit ineffective upon said brake, a pressure connection to said casing, and remotely controlled means for moving said valve to and from its seat, said means comprising a part connected with said casing for the bodily oscillation thereof between positions of opposite tilt sufficient to induce by gravity the seating and unseating movements of said valve, the conduit connections to said casing being flexible for the accommodation of the tilting movements of said casing.

13. In a device of the character described, the combination with a bracket and a valve casing barrel pivoted to the bracket intermediate its ends and provided with a seat toward one end from said pivotal connection, of a ball valve in said barrel movable to and from said seat, pressure connections to said barrel having communication therethrough controlled by said valve and adapted for accommodation of the tilting movement of the barrel, and mechanical connections to said barrel for effecting the tilting adjustment thereof from a remote point between positions for inducing gravity movement of said ball valve to and from its seat.

14. The combination with a cylindrical valve casing provided with a seat, of flexible conduits connected to the end thereof for communication through said casing, a ball valve in said casing, said casing providing means for the guidance of said ball valve to and from said seat, a bracket provided with a pivotal connection to the intermediate part of said casing, a Bowden wire sheath anchored to said bracket and a Bowden wire connected with said casing for oscillation thereof about its pivotal connection with the bracket, and means supporting said bracket in a position such that the oscillation of the casing will occur in a plane in which gravity will induce movement of the valve on said guide means to and from its seat according to the tilted position of the casing.

EDGAR A. MILHAUPT.